US010401707B2

(12) United States Patent
Schwab et al.

(10) Patent No.: US 10,401,707 B2
(45) Date of Patent: Sep. 3, 2019

(54) DEVICE FOR REFLECTING DIFFUSING OR FILTERING LIGHT DURING THE TAKING OF PHOTOGRAPHS

(71) Applicants: Christian Bernhard Schwab, Marktheidenfeld (DE); Markus Kreuzer, Marktheidenfeld (DE)

(72) Inventors: Christian Bernhard Schwab, Marktheidenfeld (DE); Markus Kreuzer, Marktheidenfeld (DE)

(73) Assignee: CARBON SYSTEM VERWALTUNGS GMBH, Marktheidenfeld (DE)

( * ) Notice: Subject to any disclaimer, the term of this patent is extended or adjusted under 35 U.S.C. 154(b) by 0 days.

(21) Appl. No.: 15/225,634

(22) Filed: Aug. 1, 2016

(65) Prior Publication Data

US 2017/0269458 A1    Sep. 21, 2017

(30) Foreign Application Priority Data

Mar. 16, 2016 (DE) .................. 20 2016 101 460 U

(51) Int. Cl.
*G03B 15/06* (2006.01)

(52) U.S. Cl.
CPC .................. *G03B 15/06* (2013.01)

(58) Field of Classification Search
CPC ...................................... G03B 15/06
USPC ............ 362/3, 16, 18; 160/373, 377; 52/222
See application file for complete search history.

(56) References Cited

U.S. PATENT DOCUMENTS

| 3,670,747 | A | * | 6/1972 | Pohl | E04H 15/00 135/156 |
| 4,462,631 | A | * | 7/1984 | Lange | B60P 3/38 135/88.16 |
| 5,122,940 | A | * | 6/1992 | Wiegand | G09F 13/0409 362/11 |
| 5,983,545 | A | * | 11/1999 | Marco | G09F 15/0025 248/176.1 |
| 7,180,665 | B2 | * | 2/2007 | Daniel | G06F 1/1601 160/373 |
| 9,348,198 | B1 | * | 5/2016 | Adams | G03B 17/565 |
| 2002/0130135 | A1 | * | 9/2002 | Fitzgerald | G07F 5/26 221/92 |
| 2011/0211174 | A1 | * | 9/2011 | Curtis | G03B 21/28 353/80 |
| 2012/0170278 | A1 | * | 7/2012 | Geller | G03B 15/06 362/320 |

(Continued)

*Primary Examiner* — Anh T Mai
*Assistant Examiner* — Michael Chiang
(74) *Attorney, Agent, or Firm* — Mark Terry

(57) ABSTRACT

A device for influencing light during the taking of photographs includes a support frame and an extensive covering wherein said support frame comprises a first stretcher rod which is attached to a first end portion of the covering and second stretcher rod which is attached to a second end portion of the covering which faces the first end portion, and wherein said support frame further comprises at least one spreader rod with end side receiving means, each having concave receiving surfaces for receiving the outer surface of respectively one stretcher rod, and wherein the at least one spreader rod with the length thereof is designed so as to retain, in the expanded state, the first stretcher rod and the second stretcher rod against the stretcher covering.

6 Claims, 3 Drawing Sheets

(56) References Cited

U.S. PATENT DOCUMENTS

2013/0272687 A1* 10/2013 Yoo ....................... G03B 15/00
                                                          396/5
2017/0227191 A1* 8/2017 Yellin ....................... F21V 7/18

* cited by examiner

DEVICE FOR REFLECTING DIFFUSING OR FILTERING LIGHT DURING THE TAKING OF PHOTOGRAPHS

CROSS-REFERENCE TO RELATED APPLICATIONS

This patent application claims priority to German utility patent application number 20 2016 101 460.3 filed Mar. 16, 2016 titled "Device For Influencing Light During The Taking Of Photographs". The subject matter of patent application number 20 2016 10 460.3 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

When taking photographs, the light available for illuminating the object or the person to be photographed is of significance. Of course, the same holds also true for film recordings. Well-illuminated objects are shown in the image in much more detail. In particular, when taking photographs outdoors, there is the problem of non-uniform distribution of the available light. Hence, clouds may cover the sun and natural obstacles (such as trees and hills) may have an unfavorable effect on the light.

During photo shoots, it is well-known to direct the natural or artificial light for the purpose of illumination to the person to be photographed with the aid of reflectors, to disperse light with the aid of diffusors or to optimize light with a view to the spectral components thereof with the aid of filters.

For this purpose, an extensive covering is disposed at a support frame. The material of the covering can be selected in accordance with functionality (reflective, light-permeable or light-filtering). Known coverings are made of a flexible material and are formed on the edge of a peripherally sewn loop. In said peripheral loop, a part of the support frame is disposed such that it keeps the covering apart in an extensive manner. Known support frames are made from aluminum tubes. The peripheral aluminum tubes are fit into one another and can be connected to one or more transversal tubes for the purpose of enhancing dimensional stability. Said transversal tubes have the same circumference as the peripheral tubes and are connected to the peripheral tubes using connection elements by means of T-shaped brackets, wherein said T-shaped brackets are screwed together.

In this regard, there is the problem that during photo shoots, for instance outdoors, the disassembled frame needs to be transported to the respective location and has to be assembled there. Assembly is time-consuming on the aspect of the type of attachment of the transversal tubes to the peripheral tubes alone. In particular, separate fastening elements, such as screws, have to be used, which are conventionally screwed in succession at several points.

SUMMARY

A method and system for influencing light during the taking of photographs is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the device for influencing light during the taking of photographs includes a support frame and an extensive covering wherein said support frame comprises a first stretcher rod which is attached to a first end portion of the covering and second stretcher rod which is attached to a second end portion of the covering which faces the first end portion, and wherein said support frame further comprises at least one spreader rod with end side receiving means, each having concave receiving surfaces for receiving the outer surface of respectively one stretcher rod, and wherein the at least one spreader rod with the length thereof is designed so as to retain, in the expanded state, the first stretcher rod and the second stretcher rod against the stretcher covering.

DETAILED DESCRIPTION

Figure 1:
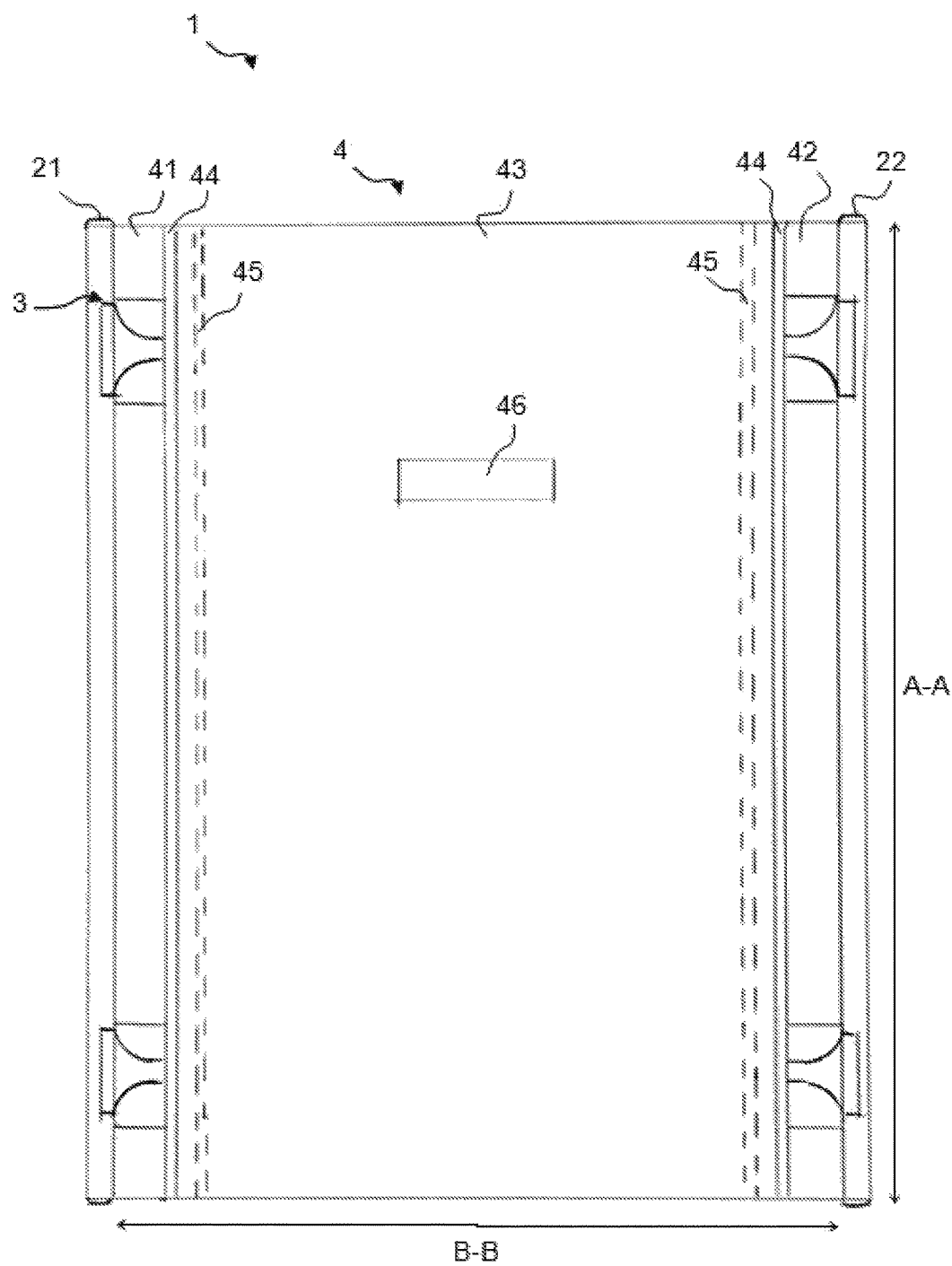
FIG. 1 is a front view of an exemplary embodiment of an inventive device.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

It is an object of the invention to provide a device for influencing light during the taking of photographs, by means of which the drawbacks encountered in prior art can be overcome and which, in particular, can be quickly assembled and is easy to handle.

The invention relates to a device for influencing light during the taking of photographs (e.g. image photographs or film recordings) with a support frame and an extensive covering. Said support frame comprises a first stretcher rod, which is attached to a first end portion of the covering, and a second stretcher rod, which is attached to a second end portion of the covering which faces the first end portion. The support frame further comprises at least one spreader rod having end-side receiving means with respectively concave receiving surfaces for receiving the outer surface of respectively one stretcher rod, and wherein the at least one spreader rod with the length thereof is designed such that it retains, in the expanded state, the first stretcher rod and the second stretcher rod against the stretched covering.

The spreader rod with the receiving means thereof is designed to receive the lateral outer surface of the first and second stretcher rod in the stretched state of the covering. In the case of round (tubular) stretcher rods, the concave receiving surfaces are advantageously designed at the receiving means with a semicircular shape (and are curved towards the middle of the spreader rod). Hence, the device can be easily disassembled, transported and quickly assembled on the spot in outdoor photo sessions. The construction renders the need for using additional fastening elements, such as screws, superfluous. For this purpose, the covering is spread and the spreader rod is inserted between the first stretcher rod and the second stretcher rod (respectively clamped against the elasticity of the spreader rod itself or against the elasticity of the covering). A width B-B of the covering (from the inner edge of one stretcher rod to the inner edge of the other stretcher rod) thereby corresponds at a maximum to the distance between the receiving surfaces of the at least one spreader rod. Advantageously, the width can be selected according to this distance so as to stretch the covering against the elasticity of the spreader rod.

According to a preferred aspect, the covering is designed elastically at least in portions in a width B-B between the first stretcher rod and the second stretcher rod. Preferably, in the un-stretched state of the covering the width B-B of the covering is shorter than the distance between the receiving surfaces of the at least one spreader rod. In this way, the covering can be stretched on the spreader rod against the elasticity of the covering itself.

Advantageously, the covering in the width B-B between the first stretcher rod and the second stretcher rod comprises a first elastic outer portion which is adjoined by a middle portion being adjoined by a second elastic outer portion. The elastic outer portions leave open to use for the middle portion a material which is elastic or not. Preferably, the outer portions measure approx. 10 cm in width and are made of an elastic textile material. The outer portions comprise the end portions by means of which the covering is fastened at the respective stretcher rod.

According to an advantageous aspect, the middle portion comprises a recess. The recess has a corresponding position and size (5×10 cm), so that a person holding the device by hand is able to look through.

Particularly preferably, the covering comprises a releasable fastener each between the first elastic outer portion and the middle portion as well as between the second elastic outer portion and the middle portion. For this purpose, a zipper for separating the outer portion and the middle portion can be provided, extending along the entire length A-A of the covering. Hence, the middle portion can be easily exchanged according to the desired functionality thereof and the respective material.

Further, preferably the middle portion comprises at least one rigid element. Advantageously, each rigid element is a plastic slat which extends along the entire length A-A of the middle portion. The first slat is arranged in the middle portion adjacent to the releasable fastener between the first elastic outer portion and the middle portion. The second slat is arranged in the middle portion adjacent to the releasable fastener between the second elastic outer portion and the middle portion. The rigid element permits simple connection by means of a zipper, since the middle portion can be so easily positioned.

Further, preferably the at least one spreader rod comprises a tube made of a carbon fiber material. This tube advantageously is a tube having a diameter of 2 cm to 10 cm, in particular 4 cm to 8 cm, with a hollow cross-section.

A preferred aspect provides that the tube made of carbon fiber material is formed of a first tube portion and a second tube portion. The first tube portion comprises an inner tube (being firmly connected thereto and protruding therefrom), the circumference thereof being selected so that the second tube portion can be (positively) fitted on the inner tube so as to join the first tube portion with the second tube portion. Hence, the spreader rod can be disassembled for transport. The tube portions can have obliquely cut abutment surfaces in order to prevent twisting of the same in the assembled state.

Particularly preferably, the support frame comprises a first spreader rod and a second spreader rod. Hence, the support frame can be configured stably also in the case of larger frame widths. Moreover, two spreader rods allow for easy carrying with two hands.

Figure 2:
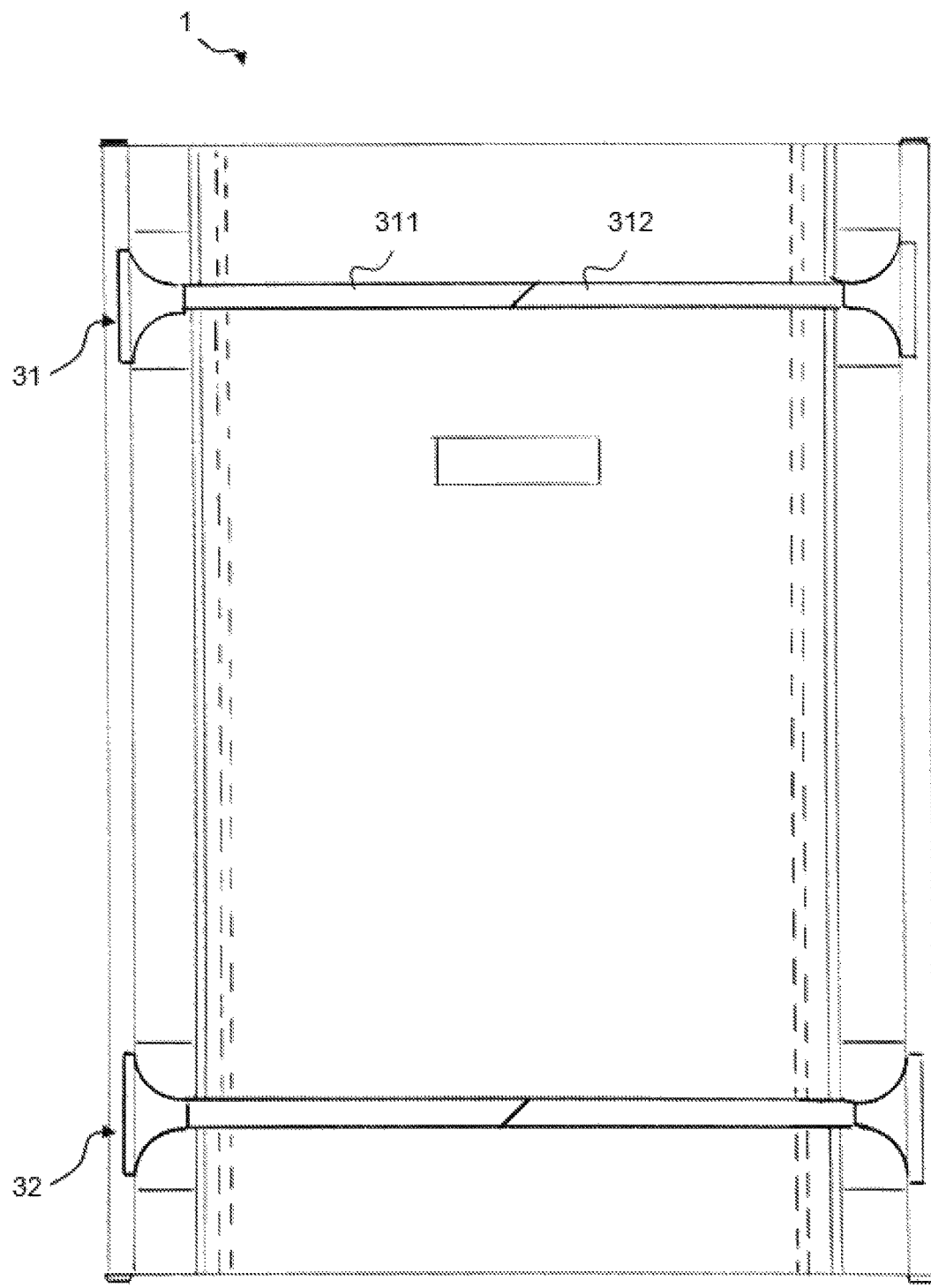
FIG. 2 is a rear view of the device of FIG. 1.

Hereinafter, the invention will be described in more detail with reference to the examples as illustrated in the attached drawings, wherein:

FIG. 1 is a front view of an exemplary embodiment of an inventive device;

FIG. 2 is a rear view of the device of FIG. 1; and

Figure 3:
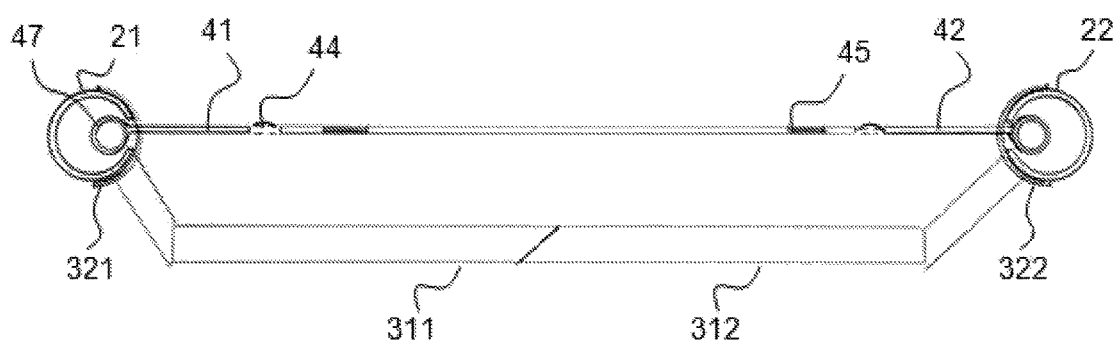
FIG. 3 is a cross-sectional view of the device of FIG. 1 and FIG. 2.

FIG. 3 is a cross-sectional view of the device of FIG. 1 and FIG. 2.

FIG. 1 shows a device 1 for influencing light during the taking of photographs with a support frame and an extensive covering 4. The support frame comprises a first stretcher rod 21, which is attached to a first end portion of the covering 4, and a second stretcher rod 22, which is attached to a second end portion of the covering 4 which faces the first end portion.

The covering 4 is designed elastically in portions in the width B-B between the first stretcher rod 21 and the second stretcher rod 22 (respectively the inner edge), by the arrangement of an inelastic middle portion 43 at a first elastic outer portion 41, adjoined by a second elastic outer portion 42. The outer portion 41, 42 in the present example measures approx. 10 cm in width and has to be distinguished from the end portion which is formed by a border bead of the covering. Between the first elastic outer portion 41 and the middle portion 43 as well as between the second elastic outer portion 42 and the middle portion 43 a zipper 44 is arranged along line A-A. Hence, the middle portion can be exchanged according to its functionality as a reflector, diffusor or light filter to allow variable use of the device.

The device 1 has a first and a second spreader rod 3 which at both ends thereof each have a receiving means with a semicircular receiving surface (see FIG. 3), which are designed so as to receive the outer surface of the first and the second stretcher rod 21, 22 in the stretched state of the covering 4. Thus, the device 1 can be assembled, transported and quickly assembled on the spot in outdoor photo shoot sessions. For this purpose, the covering is spread and the two spreader rods 2 are successively clamped between the first stretcher rod 21 and the second stretcher rod 22. The elastic formation of the covering 4 in a width B-B between the first stretcher rod 21 and the second stretcher rod 22 the spreader rods 3 makes it possible to clamp the spreader rods 3 against the elasticity of the covering 4.

Rigid plastic slats 45 are each incorporated in the middle portion 43 each adjacent to the zipper 44, which extend along the entire length A-A. Moreover, a recess 46 to look through is arranged in the middle of the covering 4.

In FIG. 2 the rear side of the device of FIG. 1 is shown. The device 1 comprises a first spreader rod 31 and a second spreader rod 32 with a tube (middle portion) made of carbon fiber material. The tube is composed of a first tube portion 311 and a second tube portion 312. The first tube portion 311 comprises an inner tube (not shown), the circumference thereof being selected so that the second (hollow) tube portion 312 can be fitted on the inner tube. Hence, the first tube portion 311 can be joined with the second tube portion 312 and can be disassembled and transported. This is advantageous in particular in case of larger dimensions of the device 1. The nested ends of the first tube portion 311 and the second tube portion 312 are obliquely cut. Hence, twisting in the connected position of the two portions 311 and 312 can be prevented.

The cross-sectional view of FIG. 3, as discussed in the following, clearly shows the formation of the receiving surfaces. The end-side receiving means can be seen with respectively semicircular receiving surfaces 321, 322, the shape thereof corresponding to the outer contour of the round stretcher rods 21, 22. In the assembled state of the device, the stretcher rods 21, 22 are each placed in the receiving surfaces 321, 322 and are stretched against them. The stretcher rods are connected to a terminal bead 47 of the covering.

The covering 4 shows a first elastic outer portion 41, an inelastic middle portion 43 and an adjoining second elastic outer portion 42. The middle portion 43 can be exchanged by means of zippers. Hence, the middle portion 43 can be exchanged according to its functionality as a reflector, diffusor or light filter so as to make variable use of the device.

In the present case, the outer portions 41, 42 are designed elastically so that the width of the covering is slightly shorter than the distance between the receiving surfaces 321, 322. Hence, the spreader rod 3 can be clamped against the elasticity of the covering 4 to assemble the device on the spot in only a few moves.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for influencing light during the taking of photographs with a support frame and an extensive covering,
wherein said support frame comprises a first stretcher rod, which is attached to a first end portion of the covering, and a second stretcher rod, which is attached to a second end portion of the covering which faces the first end portion,
wherein the covering is located in a width between the first stretcher rod and the second stretcher rod, and comprises a first elastic outer portion which is adjoined by a middle portion being adjoined by a second elastic outer portion,
wherein the covering comprises a releasable fastener respectively located between the first elastic outer portion and the middle portion and between the second elastic outer portion and the middle portion,
wherein said support frame further comprises at least one spreader rod with end-side receiving means each having semicircular receiving surfaces for receiving the outer surface of respectively one stretcher rod,
wherein the at least one spreader rod with the length thereof is designed so as to retain, in the expanded state, the first stretcher rod and the second stretcher rod against the stretched covering, and
wherein the at least one spreader rod comprises a tube made of a carbon fiber material, wherein the tube comprises a first tube portion and a second tube portion, such that the second tube portion can be fitted to join the first tube portion with the second tube portion.

2. The device according to claim 1, wherein in the unstretched state of the covering, the width of the covering is shorter than the distance between the receiving surfaces of the at least one spreader rod.

3. The device according to claim 2, wherein the middle portion comprises a recess.

4. The device according to claim 2, wherein the middle portion comprises at least one rigid element.

5. The device according to claim 4, wherein each rigid element is a plastic slat, and wherein two plastic slats are arranged along a length of the middle portion in an edge region of the middle portion.

6. The device according to claim 1, wherein the support frame comprises a first spreader rod and a second spreader rod.

* * * * *